Patented Oct. 8, 1946

2,409,061

UNITED STATES PATENT OFFICE 2,409,061

BETA-AMINO, BETA-PROPYL GLUTARONITRILES AND PROCESS OF PREPARING THEM

Richard O. Norris, Chicago, Ill., assignor to Sinclair Refining Company, New York, N. Y., a corporation of Maine No Drawing. Application August 1, 1945, Serial No. 608,361

5 Claims. (Cl. 260—464)

This invention relates to the beta-propyl-beta-amino-glutaronitriles, new chemical compounds, and a method by which they may be prepared.

The new compounds of the invention may be represented by the formula.

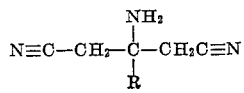

in which R is the propyl or isopropyl group. The compounds may be prepared by reaction of acetonitrile with butyro or isobutyronitrile in the presence of a condensing agent, such as sodium, the former giving the propyl compound and the latter the isopropyl compound. The products are liquids, and are useful as intermediates for the production of amino diacids by hydrolysis, triamines by reduction, and other useful products.

Beta-propyl-beta-amino-glutaronitrile has a refractive index at 20° C. of 1.5285, a density at the same temperature of 0.9688 and a boiling point of 124–127° C./4.5 mm. The corresponding isopropyl compound has a refractive index at 20° C. of 1.5274, a density at 20° C. of 0.9686 and boils at 114–117° C./4.5 mm.

The new products are prepared in accordance with the invention by the reaction of acetonitrile with butyro or isobutyronitrile in the presence of sodium, advantageously in an inert solvent such as ether, benzene, petroleum naphtha, or the like. While sodium is advantageously used, sodamide may be used instead. It is at least possible that the reaction proceeds by way of a sodium salt of one of the nitriles, although no hydrogen appears to be evolved during the reaction. The preparation of the two new compounds will be illustrated by the following example, but the invention is not limited thereto.

*Example.*—2 moles of acetonitrile, 1 mole of butyronitrile, and an equal weight of ether are placed in a reaction vessel. Sodium is added to the mixture in small pieces over a period of several hours, with stirring. The amount of sodium added is something less than theoretical to avoid the possibility of the presence of free sodium when water is added to the mixture. After the addition of sodium is complete, the reaction mixture is allowed to stand overnight and is then hydrolyzed by the slow addition of an equal volume of water. The resulting mixture is allowed to stand, and separates into two layers, the lower being discarded and the upper layer being preserved and dried over calcium chloride. Solvent and unreacted nitrile are then removed by distillation and the residue distilled under vacuum, giving beta-propyl-beta-amine-glutaronitrile with the characteristics stated above. The corresponding isopropyl compound is readily prepared by a similar procedure, using isobutyronitrile instead of butyronitrile.

I claim:

1. Compounds of the formula

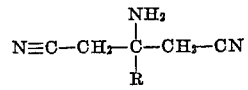

in which R is a radical of the group consisting of the propyl and isopropyl radicals.

2. Beta-propyl-beta-amino-glutaronitrile.

3. Beta-isopropyl-beta-amino-glutaronitrile.

4. The process of preparing beta-propyl-beta-amino-glutaronitriles which comprises reacting acetonitrile with a butyronitrile in the presence of a material of the class consisting of sodium and sodamide.

5. The process as in the preceding claim when carried out in an inert solvent.

RICHARD O. NORRIS.